(12) United States Patent
Schneebauer et al.

(10) Patent No.: US 11,433,588 B2
(45) Date of Patent: Sep. 6, 2022

(54) METHOD AND DEVICE FOR THE VARIOTHERMAL TEMPERATURE CONTROL OF INJECTION MOULDS

(71) Applicant: KRAUSSMAFFEI TECHNOLOGIES GMBH, Munich (DE)

(72) Inventors: Martin Schneebauer, Munich (DE); Stefan Moser, Hallbergmoos (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 215 days.

(21) Appl. No.: 16/632,959

(22) PCT Filed: Jul. 9, 2018

(86) PCT No.: PCT/EP2018/068465
§ 371 (c)(1),
(2) Date: Jan. 22, 2020

(87) PCT Pub. No.: WO2019/025122
PCT Pub. Date: Feb. 7, 2019

(65) Prior Publication Data
US 2020/0156301 A1    May 21, 2020

(30) Foreign Application Priority Data
Aug. 3, 2017   (DE) .................. 10 2017 117 587.3

(51) Int. Cl.
B29C 45/78   (2006.01)
B29C 45/73   (2006.01)
B29C 35/00   (2006.01)

(52) U.S. Cl.
CPC ............ B29C 45/78 (2013.01); B29C 35/007 (2013.01); B29C 45/73 (2013.01);
(Continued)

(58) Field of Classification Search
CPC .. B29C 2945/7604; B29C 2945/76043; B29C 2945/76531; B29C 2945/76535;
(Continued)

(56) References Cited

U.S. PATENT DOCUMENTS 5,173,224 A    12/1992  Nakamura et al.
5,376,317 A *  12/1994  Maus ...................... B29C 45/00
                                                    249/116
(Continued)

FOREIGN PATENT DOCUMENTS

CN         1059865 A    4/1992
CN       101484295 A    7/2009
(Continued)

OTHER PUBLICATIONS

International Search Report for PCT/EP2018/068465 dated Aug. 17, 2018.
(Continued)

Primary Examiner — Niki Bakhtiari
Assistant Examiner — John J DeRusso
(74) Attorney, Agent, or Firm — Pearne & Gordon LLP

(57) ABSTRACT

A method for the variothermal temperature control of an injection mould using a temperature control device, the method including at least the following steps: in a learning phase, determining a temperature control characteristic of the temperature-controllable system including at least the injection mould and the temperature control device, in order to obtain individual reference values for the system, with which the temperature control device can be controlled in
(Continued)

order to obtain a nominal temperature profile; and in a production phase: temperature control of the injection mould with the reference values determined during the learning phase; determining deviations of an actual temperature profile of the injection mould in relation to the nominal temperature profile during the production cycle and calculating corrected reference values from these deviations; and carrying out a resulting production process using the corrected reference values.

20 Claims, 4 Drawing Sheets

(52) U.S. Cl.
CPC ............. *B29C 2045/7393* (2013.01); *B29C 2945/7604* (2013.01); *B29C 2945/7626* (2013.01); *B29C 2945/76257* (2013.01); *B29C 2945/76531* (2013.01); *B29C 2945/76735* (2013.01); *B29C 2945/76739* (2013.01); *B29C 2945/76936* (2013.01); *B29C 2945/76949* (2013.01)

(58) Field of Classification Search
CPC ........... B29C 2945/76254; B29C 2945/76257; B29C 2945/7626; B29C 2945/76732; B29C 2945/76735; B29C 2945/76739; B29C 45/78; B29C 2945/76936; B29C 2945/76949; B29C 45/73; B29C 45/7306; B29C 2045/7356; B29C 2045/7393; B29C 35/007
See application file for complete search history.

(56) References Cited

U.S. PATENT DOCUMENTS

| 5,427,720 | A | * | 6/1995 | Kotzab | B29C 35/0294 |
| | | | | | 264/328.16 |
| 5,589,114 | A | * | 12/1996 | Evans | B29C 45/73 |
| | | | | | 264/328.16 |
| 2007/0184139 | A1 | * | 8/2007 | Muranaka | B29C 35/007 |
| | | | | | 425/143 |
| 2010/0065979 | A1 | | 3/2010 | Betsche et al. | |

FOREIGN PATENT DOCUMENTS

| CN | 102132224 A | 7/2011 |
| DE | 4129559 A1 | 4/1992 |
| DE | 4436117 A1 | 3/1996 |
| DE | 102004052499 A1 | 7/2006 |
| DE | 102006031268 A1 | 1/2008 |
| DE | 102008045006 A1 | 3/2010 |
| DE | 102007019389 B4 | 1/2015 |
| EP | 0218919 B1 | 4/1987 |
| EP | 2329332 B1 | 5/2012 |

OTHER PUBLICATIONS

Written Opinion for PCT/EP2018/068465 dated Aug. 17, 2018.
International Preliminary Report on Patentability for PCT/EP2018/068465 dated Oct. 21, 2019.
Seo, Jaho et al. "Thermal Dynamic Modeling and Control of Injection Moulding Process" In: University of Waterloo Department of Mechanical and Mechatronics Engineering, 2011 pp. 102-111.
Giebauf, J. "Variothermal Temperature Control—Methods and Possibilities for Use" In: Engel Austria GMBH, Jan. 2008, pp. 75-86.
Gruber, Karlheinz, "Heat Beautifies" In: Plastverarbeiter, Jul. 2008, pp. 36-38.

\* cited by examiner

METHOD AND DEVICE FOR THE VARIOTHERMAL TEMPERATURE CONTROL OF INJECTION MOULDS

CROSS-REFERENCE TO RELATED APPLICATIONS

This is a National Stage application of PCT international application PCT/EP2018/068465 filed on Jul. 9, 2018, which claims the priority of German Patent Application No. 10 2017 117 587.3, filed Aug. 3, 2017, which are incorporated herein by reference in their entireties.

The invention relates to a method and a device for the variothermal temperature control of injection moulds.

BACKGROUND OF THE INVENTION

From DE 10 2007 019 389 B4 a moulding tool temperature control system is known which, by mixing two heat media within a moulding tool temperature control device, is able to provide heat media of different temperatures for the injection mould within a short time.

From EP 2 329 332 B1 a method and a device are known for the variothermal temperature control of injection moulds, in which two temperature media with different temperatures are kept in readiness and are pumped alternately through a consumer, e.g. a moulding tool, wherein the warmer temperature control medium and also the colder temperature control medium are kept in readiness directly at or in the consumer and meet there directly or with interposition of a non-return valve, so that they are directly or indirectly in contact with one another there. The device which is disclosed for this provides the apparatus-based structure required for carrying out the method.

From "Heiß macht schön—Hochwertige Oberflächen durch variotherme Werkzeugtemperierung", Plastverarbeiter July 2008, pages 36-38 it is known that through variothermal tool temperature control high-quality surfaces are able to be achieved on plastic injection-moulded parts. Here, the tool wall is heated before the injection process to above the glass transition temperature. The tool cooling only begins after the filling of the cavity, until the moulded part has reached the required demoulding temperature. For this, heating- and cooling channels are flowed through warm and cold alternately.

From "Variotherme Temperierung—Methoden und Einsatzmöglichkeiten" by J. Gießauf, ENGEL Austria GmbH, VDI Symposium "Spritzgießen 2008—Innovation und Produktivität" of 29-30 Jan. 2008 in Baden-Baden, Germany, it is known that with a main temperature control circuit of a moulding tool, the moulding tool is heated in a constant or pulsed manner. Between channels of the main circuit and the surface of the cavity, further cooling bores are provided which are flushed with cold fluid during the cooling phase. This procedure is also able to be carried out in reverse. In addition, various physical basic principles for the temperature control of moulding tools are indicated. These are, e.g. temperature control with water, oil or steam and by means of electrical resistance heating, by means of induction, by means of thermal radiation and/or by means of infrared heating in the opened tool.

The variothermal process control is meanwhile standard in the manufacture of complex injection-moulded components. Here, the tool wall temperature is moved on various levels during the injection moulding cycle. Basically, through a higher tool wall temperature improved flow characteristics are achieved in the mould filling and thereby the following effects are achieved:
  improved moulding of microstructured surfaces,
  reduction of the visibility of joint lines,
  improved gloss,
  reduction of streaking in the processing of filled materials,
  assisting or respectively accelerating of the curing reaction of reactive plastics,
  reduction of injection pressure and clamping force,
  improved dimensional accuracy and tolerance of the produced moulded parts.

On the other hand, higher wall temperatures lead to an extension of the necessary cooling time and thereby impair the economic efficiency of the method due to smaller output. Through the use of the variothermal temperature control, this disadvantage can be counteracted by a further temperature control circuit being used on a lower temperature level to actively cool the cavity and/or partial regions thereof and thereby to accelerate the heat dissipation from the moulded part. Alongside, it can be necessary to cool the component to a lower temperature level for a better demoulding capability. In order to improve the energy efficiency and the dynamics of the system, variothermally temperature-controlled mould inserts are ideally designed with a temperature control system following the contour, close to the cavity, in order to reduce the variothermal mass as far as possible. It is therefore desirable for example to arrange heating channels or cooling channels very close to the cavity in the wall, so that owing to small tool wall thicknesses a high dynamics is able to be achieved.

In the meantime, various technologies are available on the market for the variothermal temperature control of mould inserts. These include electrical and/or inductive heating systems external to the tool or internal to the tool, systems with water cooling, double and/or triple circuit fluid systems based on oil or water, $CO_2$ temperature control systems, external lasers and systems with steam heating.

For a further improvement to the efficiency in water-water and also in oil-oil systems, an intermediate store is used, in order to hydraulically separate the temperature control medium in the closed heating and cooling circuits and to avoid a mixing of hot and cold medium as far as possible. All the methods have in common that energy is delivered cyclically to the tool and must subsequently be discharged from the tool again.

The dynamics of a tool which is to be operated variothermally result substantially from the supply temperature, the through-flow amount per unit of time, the pressure of the medium, the arrangement of the temperature control channels and the heating capacity of the temperature control equipment and the mass of the tool which is to be temperature-controlled variothermally.

None of the mentioned water-water variothermal systems offers the possibility of regulating the tool wall temperature. A hot or cold medium is merely sent into the tool circuit at the particular previously once established time. The change of the tool wall temperature is therefore merely controlled. Usefully, however, each moulding tool for the variothermal operation has a temperature sensor on the tool wall. At this location, the directing of the temperature is crucial from the point of view of technical procedure.

With such known systems, environmental influences such as e.g. the wall temperature, the supply temperature of the wall water and the wear of the tool or of the temperature control equipment, e.g. calcification, corrosion and/or changing pump output etc., can have an influence on the heating- and cooling capacity of the variothermal system. In the known, conventional controlled operation according to the prior art, this is merely detectable through the monitoring of tool wall temperature profiles. The system itself can, however, not compensate such long-term changes, which leads to fluctuations in the temperature profile. This can be disadvantageous in particular when complex working processes are present and high accuracies of the system are required.

It is known, furthermore, to provide a so-called injection clearance when an adjustable temperature level is reached at a tool wall sensor. In practice, however, overshoots of the temperature occur, which are significant noticeably in articles with long injection times and have a negative effect on the quality of the moulded part. The greater the temperature overshoot above a required level, the slower energy is extracted from the component, which leads to an extension of the cycle time. Likewise, the energy consumption becomes higher, because again cooling down must be carried out from a higher temperature level.

BRIEF SUMMARY OF THE INVENTION

It is an object of the invention to indicate a method for the variothermal temperature control of injection moulds, which permits a distinctly improved process control with distinctly improved component qualities, even when boundary conditions such as e.g. fluctuations in the melt temperature and ambient parameters such as e.g. wall temperature or suchlike, fluctuate.

The method is to be able to independently adapt the temperature control of the injection moulds to changing parameters in the course of production, in order to thus ensure an improved constancy of quality of the moulded parts.

Furthermore, it is an object of the invention to indicate a variothermal temperature control method of injection moulds which is largely independent of special knowledge and/or operator experience on the part of the operating personnel. In particular, starting from a previously established temperature profile of an injection mould or respectively of a temperature control system, it is to be able during the injection moulding cycle to independently and fully automatically come as close as possible to an ideal temperature control during a production phase.

These problems are solved by a method for the variothermal temperature control of an injection mould with the features of Claim 1. Advantageous embodiments are indicated in the subclaims dependent on Claim 1.

The method according to the invention for the variothermal temperature control of an injection mould using a temperature control device has at least the following steps:
A) In a learning phase:
  determining a temperature control characteristic of the system which is to be temperature-controlled, comprising at least the injection mould and the temperature control device, in order to obtain individual control values for the system, with which control elements of the temperature control device can be actuated in order to achieve a nominal temperature profile and
B) In a production phase:
  temperature control of the injection mould with the control values determined during the learning phase;
  determining deviations of an actual temperature profile of the injection mould in relation to the nominal temperature profile during the production cycle and
  calculating corrected control values or respectively control times for the control elements from these deviations;
  carrying out a resulting production process using the corrected control values.

Therefore, firstly in a learning phase, depending on the temperature control device which is used and the component-specific injection mould, the system which is to be temperature-controlled is characterized in a manner which is individual to the system, which in particular includes the temperature control dynamics, therefore the temperature reaction of the injection mould in the case of a heating or cooling thereof. In the knowledge of this temperature control characteristic which is individual to the system, and also in the knowledge of component-specific temperature control requirements which can be derived e.g. from empirical values of a process developer/designer, a nominal temperature profile of the injection mould is actuated. This nominal temperature profile is reflected in system-individual control values which are used for the actuation of control elements of the temperature control device, in order to achieve the nominal temperature profile.

Proceeding from these system-individual control values, the temperature control of the injection mould is then carried out in a production phase in which moulded parts are produced with the injection mould. Here, usually deviations occur of an actual temperature profile of the injection mould from the nominal temperature profile of the injection mould. These deviations are determined during the production phase starting from the first cycle of the production phase. In the knowledge of the temperature control characteristic of the system which is to be temperature-controlled, which was determined in the learning phase, corrected control values can be calculated in a good approximation from the deviations of the actual temperature profile of the injection mould from the nominal temperature profile of the injection mould. With these corrected control values, the subsequent production process, e.g. the second production process following the first production process, is then carried out. Also during this production process deviations of the actual temperature profile with respect to the nominal temperature profile are again determined and corrected control values are again calculated for the actuation of the control elements of the temperature control device. With the renewed corrected control values, the temperature control device is actuated in a subsequent production process. This procedure is maintained for the further production processes (cycles). Thus, therefore during the production phase a constant further adaptation process of the control values takes place iteratively until in the production phase the actual temperature profile coincides as precisely as possible and as closely as possible with the nominal temperature profile. In the production phase therefore a constant iterative approximating of the actual temperature profile to the nominal temperature profile takes place.

When now deviations of boundary conditions which can have an influence on the operation of the injection moulding machine together with the injection mould occur during the production phase, which comprises a plurality of successive production processes (cycles), then this will be reflected in an altered actual temperature profile. Such an actual temperature profile, also changing in a gradual manner, can then be approximated again to the nominal temperature profile by the method according to the invention. Hereby, e.g. intrusive influences which reduce quality, such as e.g. temperature fluctuations in the melt or fluctuations in the ambient temperature or suchlike can be compensated and minimized over the plurality of the production cycles (production processes). This has the result that an increased component quality is able to be achieved, without a manual intervention of an operator being necessary.

An injection moulding machine which operates by the method according to the invention can therefore guarantee independently, therefore fully automatically, an optimum variothermal temperature control also over a longer period of time during a production phase.

A particular embodiment of the method according to the invention is characterized in that
- A1) for determining a temperature control characteristic of the system which is to be temperature-controlled;
  a calculating takes place of actuation times for heating- and/or cooling devices of the temperature control device for achieving a chronological nominal temperature profile of the injection mould for a moulded par which is to be produced;
- A2) an evaluation of the nominal temperature profile is carried out in at least one evaluation cycle and if necessary correcting of the actuation times is carried out and
- A3) a storing takes place at least of the corrected actuation times from step A3) as control values for the system which is to be temperature-controlled, in particular its control elements and
- B1) during a first production cycle a starting off of the temperature profile with the control values of step A3) takes place;
- B2) a determining takes place of the actual temperatures and a comparison with corresponding nominal temperatures of the nominal temperature profile of the injection mould;
- B3) a calculation takes place of corrected control values, namely actuation times for the control elements of the subsequent production cycle from deviations determined in step B2) and
- B4) a carrying out of the subsequent production cycle takes place with the corrected actuation times from step B3) and
- B5) the steps B2) to B5) are repeated during further production cycles.

Through a multi-stage determining of the actuation times, in particular the control values corresponding hereto, already in the learning phase a quite accurate adjustment of the actual temperature profile to the desired nominal temperature profile is achieved, wherein in the production phase in addition the running optimization program, already described above, is preferably carried out in each injection moulding cycle, which is then able, by means of a precisely adapted tool temperature control, to compensate varying and/or fluctuating environmental conditions (boundary conditions) which may, if applicable, have a negative influence on the component quality.

As heating and/or cooling devices of the temperature control device advantageously at least one or a combination of the group:
- water heating- and/or water cooling device;
- oil heating- and/or oil cooling device;
- electric heating- and/or electric cooling device;
- heating- and/or cooling cartridges;
- heating devices based on induction or by means of laser and ceramic heating arrangements;
- refrigerant cooling devices and/or $CO_2$ cooling devices and/or a cooling by means of a gas, e.g. air;
- heating device and/or cooling device based on a heat transfer oil and/or on a superheated steam can be used.

The method according to the invention is advantageously able to be used irrespective of the type of heating- and/or cooling devices. Therefore, a great variability is also possible with regard to the applicability of the method according to the invention in different injection mould types or injection mould designs.

In so far as it is indicated that actuation times for heating- and/or cooling devices are determined as control values and are used in the further course, then of course depending on the heating- and/or cooling devices which are used, other parameters than the actuation time can be used. Thus, for example, it is readily possible, with the use of electric heating- and/or cooling devices to use, instead of the actuation times, for example the current intensities or other parameters which influence the heating capacity/cooling capacity of the heating device/cooling device which is used. Thus, for example, it is also feasible, with the use of heating- and/or cooling devices which use a heating- and/or cooling medium, instead of the actuation time by which usually the through-flow duration of the heating- and/or cooling medium is influenced, to also provide measures by which the through-flow amount of the medium is influenced. If applicable, control values can result herefrom in the form of actuation signals for corresponding pumps or other equipment influencing the volume flow of the medium.

It has furthermore proved to be advantageous to carry out step A) of the method according to the invention or respectively the sequence of steps A1) to A3) during the learning phase without filling the injection mould with moulding material. Hereby, it is achieved that only the temperature control characteristic of the system which is to be temperature-controlled is able to be determined, without influences of the melt being able to impair this determining.

Moreover, it is advantageous that such a determining of the temperature control characteristic can be carried out in an e.g. standardised test set-up. A mounting of the system which is to be temperature-controlled on an injection moulding machine is not necessary here. Therefore, for example, the temperature control characteristic of the system which is to be temperature-controlled can be determined under laboratory conditions without, where applicable, disadvantageous and fluctuating external circumstances.

Furthermore, it is expedient to associate control values determined in a test set-up which is standardised in such a way for the system to be temperature-controlled, dealt with in the learning process, as temperature control system-specific control values with the system which is to be temperature-controlled and if applicable to store them in a suitable manner. With such temperature control system-specific control values, the system which is to be temperature-controlled, therefore at least the injection mould and the temperature control device, can then be readily operated in good approximation for example with an initial operation on an injection moulding machine and the production process can be begun immediately. During the production process, then—as previously described—a further iterative approximation takes place to the predetermined ideal temperature profile in the injection mould.

In a further embodiment of the method according to the invention, for the determining of the temperature control characteristic of the system which is to be temperature-controlled at least consisting of a heating device, a cooling device, a control element for the medium and an injection mould, a minimum achievable wall temperature ($T_{min}$) of a cavity of the injection mould is determined and stored.

Moreover, for determining the temperature control characteristic of the system which is to be temperature-controlled at least consisting of a heating apparatus, a cooling apparatus, at least one control element for this and an injection mould, a maximum achievable wall temperature ($T_{max}$) of a cavity of the injection mould is determined and stored.

These two measures constitute the first steps in order to limit the temperature control characteristic of the system which is to be temperature-controlled with regard to the maximum and minimum temperatures which are able to be reached. Within this temperature window between $T_{min}$ and $T_{max}$ therefore a variothermal temperature control can take place of the system which is to be temperature-controlled, in particular of the injection mould.

To determine the temperature control dynamics, advantageously furthermore during the heating-up process the maximum rise of a heating curve lies between $T_{min}$ and $T_{max}$, which lies at the turning point thereof, and the maximum rise is determined in the unit of Kelvin per second ($Ks_{heat}$) for the "pulse heating" operation type.

This can take place for example in that at the turning point of the heating curve a tangent is applied to the heating curve and an intersection of the tangent with the abscissa is formed, wherein the chronological interval between the start of the heating and the intersection of the tangent with the abscissa is defined as delay time $tu_{heat}$. Through this measure, and in particular depending on the resulting delay time $tu_{heat}$, the temperature control dynamics of the system which is to be temperature-controlled can be determined, which inter alia represents an essential point of the total temperature control characteristic.

In an analogous manner to the heating process, proceeding from the maximum achievable temperature $T_{max}$, the cooling is started with the heating switched off, wherein the maximum negative increase in Kelvin per second is determined at the turning point of the cooling curve ($K/s_{cool}$) and a tangent is applied at the turning point of the cooling curve. The intersection of the tangent with the abscissa is determined and a delay time $tu_{cool}$ is defined as a chronological interval between the start of the cooling and the intersection of the tangent with the abscissa.

Through these measures, the temperature control dynamics can be determined well for the "pulse cooling" (cooling dynamics) operating type of the system which is to be temperature-controlled. This permits conclusions concerning the cooling characteristic of the system which is to be temperature-controlled.

Furthermore, it is advantageous to calculate a mean temperature $T_{Basis}$ between the minimum temperature $T_{min}$ and the maximum temperature $T_{max}$. This can be used as a starting point for further calculations.

For example, from the formula with $$t_{basisheat} = ((T_{Basis} - T_{min})/K/s_{heat}) + tu_{heat}$$

the actuation time ($t_{basisheat}$) can be calculated for a pulse heating from the minimum temperature ($T_{min}$) to the mean temperature ($T_{Basis}$).

With this calculation therefore a specific time span is calculated for the operation of the heating device, in order to arrive from the minimum temperature ($T_{min}$) to the mean temperature ($T_{Basis}$) wherein the delay time ($tu_{heat}$) is already included and therefore the determined actuation time already takes into account temperature control-dynamic aspects of the system which is to be temperature-controlled.

Furthermore, it is advantageous that after the switching off of the heating, i.e. after the time ($t_{basisheat}$) has elapsed, a time span is measured until no further significant temperature change occurs at the tool wall sensor, wherein a temperature ($T_{basisheat}$) and a reverberation time (dead time) ($t_{Basisheatdead}$) is measured and stored.

Hereby, the effect of the post-heating, after the switching off of the heating has already taken place, can be readily determined and predictions can be made as to how long the tool still heats up, although the heating is already switched off.

With such a resulting temperautre $T_{Basisheat}$ an overshoot temperature $T_{Basisheaterror}$ can be calculated from the formula $$T_{Basisheaterror} = T_{Basisheat} - T_{Basis}$$

The method described above for the case of heating can be carried out in an analogous manner in the reverse direction for the case of cooling, wherein the heating is actuated while the cooling is switched off, until the maximum temperature ($T_{max}$) is reached at the tool wall sensor, then the cooling is activated with the heating switched off and from the formula $$t_{basiscool} = ((T_{max} - T_{Basis})/K/s_{cool}) + tu_{cool}$$

the actuation time ($t_{basiscool}$) is calculated for a pulse cooling from the maximum temperature ($T_{max}$) to the mean temperature ($T_{Basis}$). Therefore, any desired temperature can be initiated between $T_{min}$ and $T_{max}$.

Hereby it is successful in an analogous manner to determine an actuation time for the cooling device, by which it is possible to cool down the injection mould from the maximum temperature $T_{max}$ to mean temperature $T_{Basis}$. Also a downstream undershooting (post-cooling) is determined in an analogous manner to the overshooting in the heating cycle, wherein proceeding from the maximum temperature ($T_{max}$) from a previous learning step the cooling is actuated and is switched off after the time ($t_{basiscool}$). Following on therefrom, the time is measured until no significant temperature change is able to be measured at the tool wall sensor in the cavity, wherein the temperature ($T_{basiscool}$) and the reverberation time (dead time) ($t_{Basiscooldead}$) is measured and stored and the deviation from ($T_{Basis}$) to ($T_{Basiscool}$) is calculated according to the formula $$T_{Basiscoolerror} = T_{Basis} - T_{Basiscool}$$

Furthermore, it is advantageous in a process sequence for at least one pulse heating step or at least one pulse cooling step, to measure and store actuation times of the heating device and/or of the cooling device starting from the actual temperature of the cavity wall ($T_{actMld}$), wherein the nominal temperature ($T_{Soll}$) is determined from the current step and when the nominal temperature ($T_{Soll}$) is greater than the temperature ($T_{actMld}$), in the first optimisation run the time ($t_{Prozess1}$) is calculated according to the formula $$t_{Prozess1} = ((T_{Soll1} - T_{actMld})/K/s_{heat}) + tu_{heat} + T_{Basisheaterror}/K/s_{heat}$$

Through this provision, a current, therefore an actual temperature of the cavity wall ($T_{actMld}$) is now measured and hereby this is acted on in a correcting manner when the nominal temperature ($T_{Soll}$) is greater than the actual temperature ($T_{actMld}$).

For the case situated the other way round, namely that the nominal temperature $T_{Soll}$ is lower than the actual temperature $T_{actMld}$, the time $T_{Prozess1}$ is calculated from the formula $$t_{Prozess1} = ((T_{Soll1} - T_{actMld})/K/s_{cool}) + tu_{cool} + T_{Basiscoolerror}/K/s_{cool}$$

For the more precise determining of the time calculation of the time $t_{Prozess1}$, it is recommended to carry out further processes in an analogous manner and to obtain a plurality of iteratively improved times $t_{Prozess1}$. In particular, for determining the time $t_{Prozess1}$ for a pulse heating process or a pulse cooling process, carrying out a number of times has proved to be advantageous.

A further embodiment of the method according to the invention is characterized in that during further passages the actuation times of the heating device and/or of the cooling device are corrected by a start temperature deviation ($T_{startOffset}$) and/or an end temperature deviation $T_{endOffset}$) with respect to the nominal temperature (reference), wherein formulae listed below are used:

$$T_{startOffsetx} = T_{actMldx} - T_{(actMldx)n-1}$$

$$T_{endOffset} = T_{Prozessx} - T_{(Prozessx)n-1}$$

and wherein (n−1) is the corresponding temperature from the preceding passage.

With this provision, an altered start temperature, whether higher or lower than a corresponding nominal start reference temperature, can be determined. Such a starting temperature at the start of the process or at the end of the process has a direct influence on the actuation times of the heating device and/or of the cooling device for the next, subsequent production process.

Such changes to the actuation times, resulting herefrom, can be determined in particular in a preferred embodiment of the method which is distinguished in that a time ($t_{startOffset}$) and ($t_{endOffset}$) corresponding to the start temperature deviation ($T_{startOffset}$) and/or to the end temperature deviation ($T_{endOffset}$) is calculated depending on the dynamics of the pulse heating (K/$S_{heat}$) or of the pulse cooling (K/$s_{cool}$), wherein For pulse heating: $t_{startOffset} = T_{startOffset}/Ks_{heat}$ $t_{endOffset} = T_{endOffset}/s_{heat}$ For pulse cooling: $t_{startOffset} = T_{startOffset}/K/s_{cool}$ $t_{endOffset} = T_{endOffset}/K/s_{cool}$ Therefore, different start or end temperatures are taken into account for the calculation of the heating times and/or of the cooling times, therefore of the actuation times (control values) for the heating device and/or of the actuation times (control values) for the cooling device.

To obtain the actuation time ($t_{Prozess(x)}$) expediently the sum is determined from the actuation time of the pre-process ($t_{Prozess(x-1)}$) of the time ($t_{startOffset}$) of the present process and the time ($t_{endOffsetx-1}$) of the preceding process.

With a thus determined actuation time ($t_{Prozess(x)}$), which can be used either for the pulse heating (heating process) or the pulse cooling (cooling process), a plurality of characteristics of the present system and also, if applicable, deviations, are taken into account during the production process.

A further object of the invention is to indicate a device for carrying out the method for the variothermal temperature control of injection moulds.

This problem is solved by a device having the features of Claims 23. Advantageous embodiments are indicated in the subclaims dependent on Claim 21.

The above-mentioned problems are solved with a device for carrying out the method, which has at least one temperature control apparatus with a heating device, at least one temperature control apparatus with a cooling device and an injection mould, control elements and a regulating unit, which can act in a regulating manner on the control elements, wherein the regulating unit provides signals as a function of cavity wall temperature of a cavity of an injection mould for the regulating of the control elements.

The method according to the invention can be carried out with such a basic structure in an advantageous and simple manner. For the method according to the invention in particular no unusual components are necessary, so that the method according to the invention can also be retrofitted or can be realized by retrofitting few components without great additional effort with regard to apparatus on existing plastic injection moulding machines.

As heating devices in particular one or more devices selected from the group
 water heating device;
 oil heating device;
 electric heating device;
 heating cartridges;
 heating devices based on induction or by means of laser and ceramic heating arrangements;
 heating device based on a heat transfer oil and/or a superheated steam
can be used.

As cooling device, at least one device selected from the group
 water cooling device;
 oil cooling device;
 electric cooling device;
 cooling cartridges;
 cooling arrangements by means of refrigerant and/or $CO_2$ and/or by means of a gas, eg. air;
 cooling device based on a heat transfer oil and/or carbon dioxide
can be used.

Therefore also a plurality of heating- and/or cooling device types—also in combination with one another—can be used in order to carry out the method according to the invention.

It is particularly advantageous that the device has, in addition, a buffer which is arranged and formed to provide cold temperature control medium and/or hot temperature control medium and, if required, to feed in additional warm or cold temper medium into temperature control circuits of the system which is to be temperature-controlled. Such a buffer can make sense in particular when at particular locations or at particular points in time of the process a particularly high heating- and/or cooling capacity is necessary. For such a case, through a provision of a buffer, the efficiency of the cooling device can be kept small, because for example for short heating- and/or cooling phases only a storage of warm temperature control medium or cold temperature control medium in the buffer is sufficient. Therefore, this contributes to the saving of energy and reduces the costs of the system, because if applicable smaller temperature control devices can be used.

Expediently, the device according to the invention has a regulating device which is or comprises a data processing device which can carry out the method steps according to the method in accordance with the invention.

BRIEF DESCRIPTION OF THE DRAWINGS

The invention is explained in further detail below by way of example with the aid of the drawings. There are shown.

DESCRIPTION OF EXAMPLE EMBODIMENTS

Figure 4:
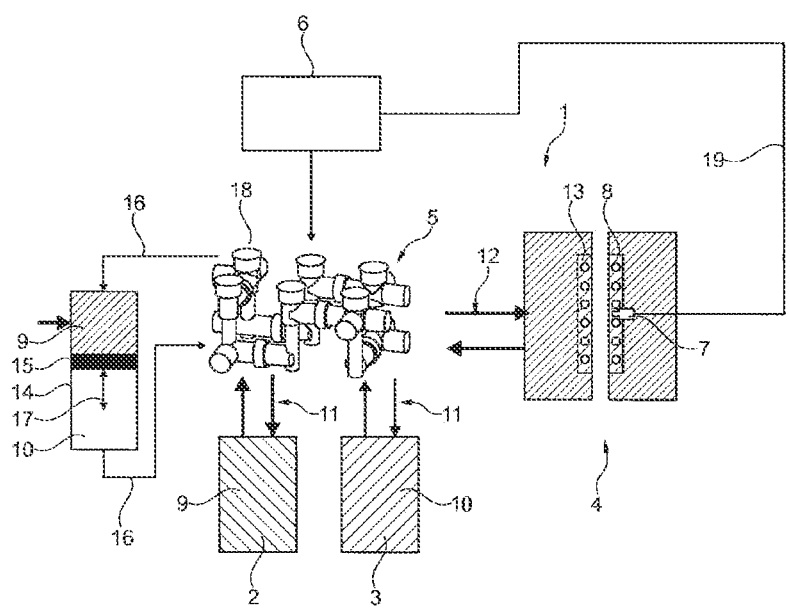
FIG. 4: schematically a device for carrying out the method for the variothermal temperature control of injection moulds.

A device 1 for carrying out the method according to the invention is illustrated schematically in FIG. 4 and has a temperature control apparatus 2 with a heating device, at least one temperature control apparatus 3 with a cooling device and an injection mould 4, control elements 5 and a regulating unit 6. The regulating unit 6 can act in a regulating manner on the control elements 5, wherein the regulating unit 6 processes signals as a function of a cavity wall temperature, which is determined for example by a temperature sensor 7 which sits in a cavity 8 of the injection mould 4.

The temperature control apparatus 2 with a heating device provides a relatively hot temperature control medium 9 compared to the temperature control apparatus with a cooling device 3, which provides a relatively cold temperature control medium 10.

The temperature control apparatuses 2, 3 are connected with the control elements 5 via suitable pipe lines (illustrated schematically by the arrows 11). The control elements 5 are connected with the injection mould 4 via suitable piping systems or hose systems (arrows 12). The injection mould 4 has at least one temperature control circuit 13, through which hot temperature control medium 9 or cold temperature control medium 10 is able to be directed alternately. Alternatively, it is also possible that the injection mould has two temperature control circuits 13, which are separated from one another hydraulically. One of the two temperature control circuits 13 serves for the directing of the cold temperature control medium 10, the other temperature control circuit serves for the directing of the hot temperature control medium 9 through the injection mould 4 or an injection mould half.

Preferably, the device 1 has a buffer 14 which keeps available a certain store of hot temperature control medium 9 and a store of cold temperature control medium 10. For example, the buffer 14 is equipped with a displaceable piston element 15, which divides a buffer chamber into a compartment for hot temperature control medium 9 and a compartment for cold temperature control medium 10. The compartment containing hot temperature control medium 9 and also the compartment containing cold temperature control medium 10 are respectively connected via suitable pipe lines 16 with corresponding inlets of the control elements 5. By movement of the piston 15 in the double arrow direction 17, an additional amount of cold temperature control medium 10 (movement of the piston 15 in FIG. 4 downwards), or hot temperature control medium 9 (movement of the piston 15 in FIG. 4 upwards), can be briefly fed into the temperature control circuits 13 via the control elements 5.

The control elements 5 are for example an arrangement of various valves 18, which are only indicated schematically. The valves 18 are, for example, electrically actuatable valves, which are connected with the regulating unit 6 and are able to be actuated by the latter. Depending on the actuation of the valves 18, either cold temperature control medium 10 or warm temperature control medium 9 can be fed into the temperature control circuits 13, wherein, as required, additional cold temperature control medium 10 or hot temperature control medium 9 can be fed in through the buffer 14 for example for achieving high cooling- or heating gradients. The provision of a buffer 14 makes it possible to use relatively small heating/cooling- and/or pump units for the temperature control apparatuses 2, 3, and nevertheless to capture injection loads which occur in a learning-and/or production cycle, by means of the buffer 14. This contributes to a saving of energy and reduces the system costs.

The temperature sensor 7 is connected with the regulating unit 6 via a suitable signal line 19. Of course, it is possible that a plurality of temperature sensors 7 are arranged distributed over the cavity wall of the cavity 8 and send separate signals, which represent a local cavity wall temperature, to the regulating unit 6 or respectively make them available to it.

In the present example embodiment according to FIG. 4, for simplification of the illustrated principle only one temperature sensor 7 is shown. It is of course also possible to use several temperature sensors 7 e.g. at different locations of the cavity wall.

Furthermore, in the embodiment according to FIG. 4 a hydraulic temperature control is concerned, in which a liquid cold temperature control medium 10 and a liquid hot temperature control medium 9 is used.

Of course, other types of heating/cooling are also conceivable. For example, electric heating- and/or cooling elements or gases can be used as temperature control medium.

When now for example with the temperature control apparatus 3 switched off or clamped off with cool temperature control medium hot temperature control medium 9 is pumped through the cooling circuits 13, the cavity wall of the cavity 8 will heat up.

Vice versa, it will cool down when instead of the hot temperature control medium 9 cold temperature control medium 10 is sent through the temperature control circuits 13.

With this device, the method according to the invention, described in the following, can be carried out advantageously.

A method according to the invention for the variothermal temperature control of the injection mould 4 is carried out in two phases, a learning phase A and a production phase B. Within the learning phase A, a determining takes place of the temperature control characteristic of the system which is to be temperature-controlled, which has at least the injection mould 4, the temperature control devices 2, 3 and the corresponding (pipe-) line connections and the control elements 5 and the regulating unit 6. Of course, a temperature sensor 7 is to be provided in the cavity 8 of the injection mould 4.

This entire system which is to be temperature-controlled (the injection mould 4) or respectively is to provide for the temperature control (temperature control apparatuses 2, 3, control elements 5 and the corresponding connections with the injection mould 4), has a particular temperature control characteristic which is influenced for example by the cavity shape of the cavity 8 in the injection mould 4. Further influencing variables can be the efficiency of the temperature control apparatuses 2, 3 and the maximum possible through-flow quantity of cold temperature control medium 10 and/or hot temperature control medium 9.

Such a system of the above-mentioned components has a particular temperature control characteristic, i.e. on a particular activity of the temperature control apparatuses 2 or 3 a particular temperature reaction takes place of the cavity wall of the cavity 8 in the injection mould 4. This is to be determined in the learning phase A.

Figure 1:
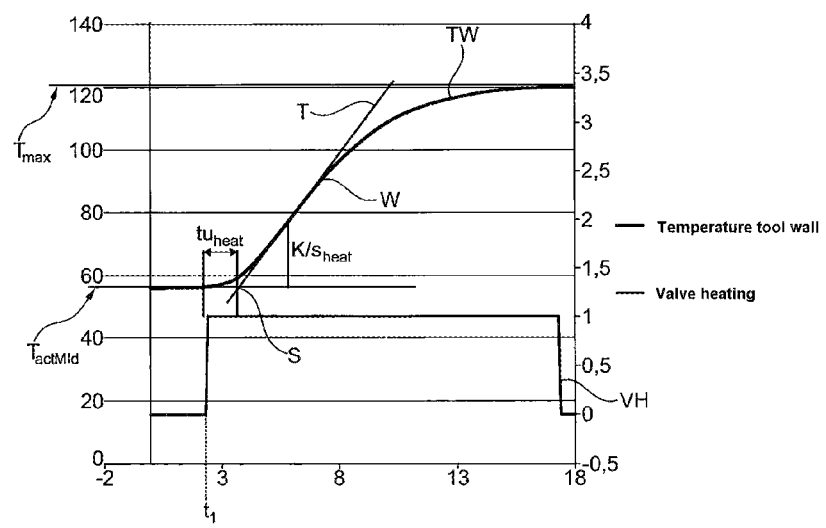
FIG. 1: schematically a heating curve of an injection mould during a learning phase from a minimum temperature to a maximum temperature.

FIG. 1 shows a first partial step hereof.

Within the determining of the temperature control characteristic of the system, proceeding from a current moulding tool temperature (cavity wall temperature $T_{actMld}$) with the temperature control apparatus 3 with cooling device switched off, the temperature control apparatus 2 with heating device is switched on. The switching on of the heat temperature control takes place in the illustrated example according to FIG. 1 at the time $t_1$. The graph VH (valve heating) is illustrated in FIG. 1 and indicates a time span in which the device 1 heats the injection mould. As a reaction to the heating, the graph TW indicates the temperature reaction at the cavity wall of the cavity 8, which is measured by the temperature sensor 7. After the switching on (time $t_1$), firstly an increasingly more steeply rising temperature rise takes place on the tool wall, which in the further course approaches asymptotically a maximum achievable temperature $T_{max}$ which is able to be reached with the present system (injection mould 4, temperature control apparatuses 2, 3).

The graph TW has in its course a turning point W. For determining a characteristic value for the temperature control characteristic of the system, it has proved to be successful to apply in the turning point W a tangent T to the graph TW. The maximum rise of the heating curve (graph TW) is present in the turning point W. The tangent forms an intersection S with the abscissa. The period of time between the start of the heating (time $t_1$) and the intersection S is defined as delay time $tu_{heat}$. The maximum rise of the tangent T is defined by a quotient of temperature and heating time, which is indicated in "Kelvin per heating time ($K/s_{heat}$)".

With this procedure, starting from a current temperature $T_{actMld}$ of the injection mould 4, its heating-up characteristic up to the temperature $T_{max}$ is able to be determined and herefrom the values $K/s_{heat}$ and $tu_{heat}$ are able to be determined.

Figure 2:
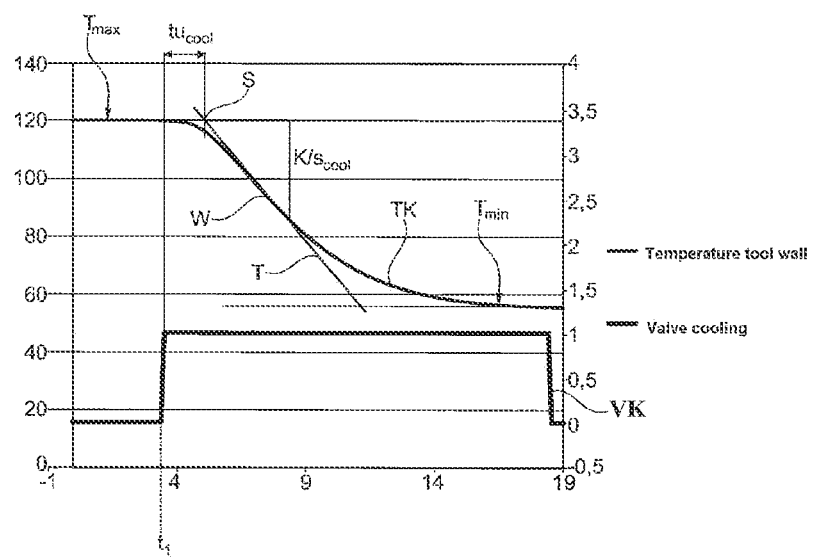
FIG. 2: schematically a cooling curve of an injection mould during a learning phase from a maximum temperature to a minimum temperature.

In an analogous manner, a determining takes place of the cooling-down characteristic of the injection mould 4 starting from a maximum achievable temperature $T_{max}$ (cf. FIG. 2). In an analogous manner to the heating up, within the determining of the cooling-down characteristic, a cooling curve (graph TK) is determined, which can be reduced from the maximum injection mould temperature $T_{max}$ to a minimum achievable temperature $T_{min}$. For this, with the temperature apparatus 2 (warm temperature control apparatus) switched off, the temperature control apparatus 3 with cool temperature control medium 10 is switched on. The switched on cooling is represented with the graph VK. Also within the determining of the cooling characteristic, a tangent T is applied at the turning point W, the rise of which reflects the maximum cooling-down gradient. This cooling-down gradient can be indicated in the unit Kelvin per cooling time ($K/s_{cool}$).

This tangent likewise intersections the abscissa S, so that a cooling delay time $tu_{cool}$ results, which results from the time $t_1$ (switching on of the cooling unit) to the intersection S of the tangent T with the abscissa.

This characterizing of the heating up or respectively cooling down behaviour of the system takes place preferably with an empty injection mould, i.e. still entirely without melt. Hereby, it is not necessary to carry out the learning phase with an injection mould which is mounted on a plastic injection moulding machine. A further advantage is that the use of plastic melt does not influence the tool temperature control characteristic or respectively the system temperature control characteristic.

The determined temperature control characteristic of the system is preferably stored in the form of tool-specific, in particular system-specific control values for control elements or is otherwise assigned to the tool/system.

Further steps in the learning phase A are:

From this temperature control characteristic for example through differentiation between the maximum achievable temperature $T_{max}$ and the minimum achievable temperature $T_{min}$ a mean temperature $T_{Basis}$ can be calculated. With the mean temperature $T_{Basis}$ an activation time can be determined for the corresponding heating valves, which is necessary, which becomes necessary with a heating (pulse heating) from the minimum temperature $T_{min}$ to the mean temperature $T_{Basis}$. This takes place using the determined heating gradient $K/s_{heat}$ and the correspondingly determined delay time $tu_{heat}$ according to the formula:

$$t_{basisheat} = ((T_{Basis} - T_{min})/K/s_{heat}) + tu_{heat}.$$

It has been found that after the switching-off of the heating with a temperature of the injection mould 4 below the maximum achievable temperature $T_{max}$, an overshooting of the temperature beyond a desired target value takes place. In order to compensate this overshooting, the time span is measured until after the switching-off of the heating a significant temperature change no longer occurs. The temperature excess occurring here ($T_{basisheat}$) and the measured reverberation time ($t_{basisheatdead}$) is likewise measured and stored. From this, a deviation is calculated between the mean temperature $T_{Basis}$ and the temperature $T_{basisheat}$ according to the formula:

$$T_{Basisheaterror} = T_{Basisheat} - T_{Basis}$$

In an analogous manner, the determining of an undershooting takes place in the case of cooling, whereby a reverberation time in the case of cooling ($t_{basiscool}$) and a minimum temperature $T_{basiscool}$ occurring in the case of undershooting is measured and stored. Herefrom, a deviation results between the mean temperature $T_{Basis}$ and the minimum occurring undershoot temperature $T_{basiscool}$ according to the formula:

$$T_{Basiscoolerror} = T_{Basis} - T_{Basiscool}.$$

With the temperature $T_{Basiscoolerror}$ or respectively with the temperatures $T_{Basiscoolheaterror}$, taking into account the overshoot/undershoot phenomena in the heating/cooling, the process times $t_{Prozess1}$ for the case of heating and the case of cooling can be determined more precisely, in order to reach as precisely as possible a nominal temperature $T_{Soll}$ starting from a current injection mould temperature (cavity wall temperature $T_{actMld}$).

A previously described determining of the times $t_{Prozess1}$ both for the case of cooling and for the case of heating is carried out several times for a better delimitation and a more precise determining of the error temperatures $T_{Basisheaterror}$ and $T_{Basiscoolerror}$. Here, a repetition several times has proved to be successful.

The actuation times of the heating device and/or of the cooling device are corrected from one process to the next through corresponding start offset temperatures $T_{startOffset}$ or respectively end temperature deviations $T_{endOffset}$ in order to also take into account at the start/end of the one process the start/end temperatures of the preceding process. With these offset temperatures $T_{startOffset}$ and $T_{endOffset}$ corresponding offset times $t_{startOffset}$ and $t_{endOffset}$ can be determined both for the heating and for the cooling. This takes place according to the formulae For pulse heating: $t_{startOffset} = T_{startOffset}/K/s_{heat}$ $t_{endOffset} = T_{endOffset}/K/s_{heat}$ For pulse cooling: $t_{startOffset} = T_{startOffset}/K/s_{cool}$ $t_{endOffset} = T_{endOffset}/K/s_{cool}$ Therefore, from the process time $t_{Prozess(x-1)}$ of the preceding process and the start offset time $t_{startOffset(x)}$ of the current process and the end offset time $t_{endOffset(x-1)}$ of the preceding process, the process time $t_{Prozess}(x)$ can be calculated for the current process, which is used for the current case of heating/case of cooling. Hereby, a learning is successful for the current process from the environmental conditions and the sequence of the preceding process.

Figure 3:
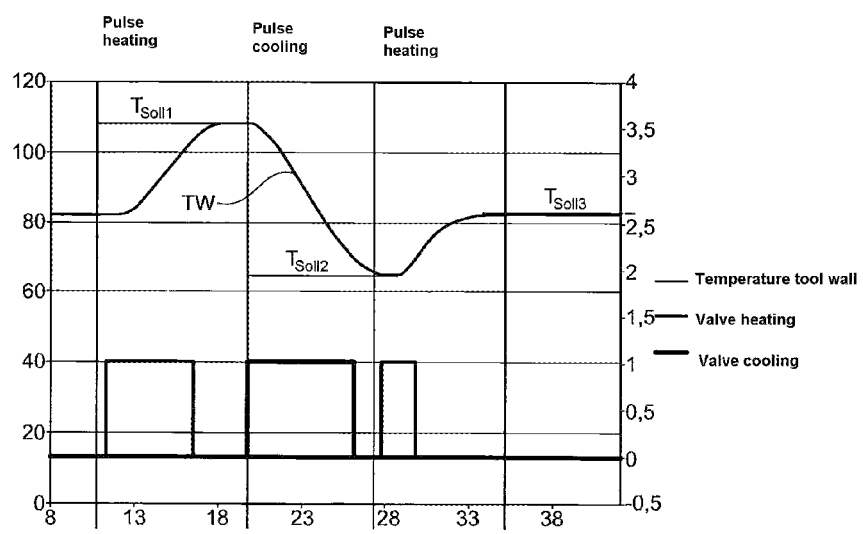
FIG. 3: by way of example, a temperature profile of a tool wall or respectively of an injection mould during a production phase.

As a result, by the method according to the invention and a device 1 suitable for carrying out the method, a targeted start-off of a nominal temperature profile, in particular achieving explicit nominal temperatures $T_{Soll1}$, $T_{Soll2}$ is possible in a very precise manner and adaptably to varying environmental conditions (cf. FIG. 3).

The graph TW, which indicates the tool temperature over the time t is represented in FIG. 3. Likewise, target temperatures $T_{Soll1}$ and $T_{Soll2}$ and $T_{Soll3}$ are indicated. In the lower half of the illustrated diagram according to FIG. 3, switch-on times are represented for the operation of the temperature control apparatus 2 with a heating device and of the temperature control apparatus 3 with a cooling device. Viewed from left to right, with a time t of approximately 10 seconds a switching-on of the temperature control apparatus 2 with the heating device takes place, so that the graph TW rises starting from this time (taking into account the time $tu_{heat}$), up to a nominal temperature $T_1$, which in the example embodiment lies approximately at 109°. At the temperature level $T_{Soll1}$ the temperature of the injection mould 4 is kept approximately constant for a time. At the time t of approximately 20 seconds, the cooling begins by switching on of the temperature control apparatus 3 with the cooling device, so that a cooling of the tool takes place from $T_{Soll1}$ to a temperature $T_{Soll2}$ lying therebelow. Proceeding from $T_{Soll2}$, before the reaching of which the temperature control apparatus 3 with the cooling device is already switched off, a renewed heating up of the tool takes place by switching on of the temperature apparatus 2 with the heating device, so that a further nominal temperature ($T_{Soll3}$) is reached, which in the example embodiment lies between the nominal temperatures $T_{Soll1}$ and $T_{Soll2}$.

Therefore, for achieving the temperature $T_{Soll1}$ a so-called pulse heating takes place. Proceeding from the temperature $T_{Soll}$ a so-called pulse cooling takes place for achieving the temperature $T_{Soll2}$, whereas the achieving of the temperature $T_{Soll3}$ takes place proceeding from the temperature $T_{Soll2}$ by means of a pulse heating.

It has proved to be expedient to bring about the temperature control exclusively through switching on either the temperature control apparatus 2 with heating device or the temperature control apparatus 3 with cooling device. A mixing of the temperature control media preferably does not take place. A system with separate cold temperature control medium 10 and hot temperature control medium 9, viewed as a whole is essentially more dynamic than a system which attempts to achieve a particular temperature by the mixing of cold and warm temperature control medium. Therefore, through the separate temperature control circuits, more dynamic pulse heating—and pulse cooling processes are possible.

LIST OF REFERENCE NUMBERS 1 device
2, 3 temperature control apparatus
4 injection mould
5 control elements
6 regulating unit
7 temperature sensor
8 cavity
9 hot temperature control medium
10 cold temperature control medium
11, 12 arrows
13 temperature control circuit
14 buffer
15 displaceable piston element
16 pipe lines
17 double arrow direction
18 valves
19 signal line
A learning phase
B production phase
S intersection
VH graph
TK graph
TW graph
$T_{max}$ maximum achievable temperature
t1 switch-on time
Tmin minimum achievable temperature
T tangent
W turning point

What is claimed is:

1. A method for the variothermal temperature control of an injection mould using a temperature control device having at least the steps:
  A) in a learning phase:
    determining a temperature control characteristic of a system which is to be temperature-controlled comprising at least the injection mould and the temperature control device, in order to obtain individual control values for the system, with which control elements of the temperature control device can be actuated in order to obtain a nominal temperature profile and
  B) in a production phase:
    temperature control of the injection mould with the control values determined during the learning phase;
    determining deviations of an actual temperature profile of the injection mould in relation to the nominal temperature profile during a production cycle and calculating corrected control values for the control elements from these deviations;
    carrying out a resulting production process using the corrected control values; and
    for determining the temperature control characteristic of the system which is to be temperature-controlled, a maximum wall temperature ($T_{max}$) of a cavity of the injection mould which is achievable by the system is determined and stored and proceeding from the maximum wall temperature ($T_{max}$), cooling is started with heating switched off, wherein a maximum negative increase is determined in Kelvin per second ($K/s_{cool}$) at a turning point (W) of a cooling curve (TK) and a tangent (T) is applied at the turning point (W) of the cooling curve (TK), wherein an intersection of the tangent (T) with an abscissa is determined and a delay time ($tu_{cool}$) is defined as a chronological interval between a start of cooling and the intersection of the tangent (T) with the abscissa.

2. The method according to claim 1, wherein
A) in the learning phase:
   A1) for determining the temperature control characteristic of the system which is to be temperature-controlled,
       a calculating takes place of actuation times for heating and/or cooling devices of the temperature control device for achieving the nominal temperature profile of the injection mould for a moulded part which is to be produced;
   A2) an evaluation of the nominal temperature profile is carried out in at least one evaluation cycle to determine corrected actuation times
   A3) a storing takes place at least of the corrected actuation times from step A2) as control values for the control elements of the system which is to be temperature-controlled and
B) in the production phase:
   B1) during a first production cycle a starting off of the nominal temperature profile with the control values of step A3) takes place;
   B2) a determining takes place of actual temperatures and a comparison with corresponding nominal temperatures of the nominal temperature profile of the injection mould;
   B3) a calculation takes place of corrected control values for the control elements of a subsequent production cycle from deviations determined in step B2) and
   B4) a carrying out of the subsequent production cycle takes place with the corrected control values from step B3) and
   B5) the steps B2) to B4) are repeated during further production cycles.

3. The method according to claim 1, wherein heating and/or cooling devices of the temperature control device include at least one of the group:
water heating and/or water cooling device;
oil heating and/or oil cooling device;
electric heating and/or electric cooling device;
heating and/or cooling cartridges;
heating devices based on induction or by means of laser or ceramic heating arrangements;
refrigerant cooling devices and/or $CO_2$ cooling devices and/or a cooling by means of a gas;
a superheated steam.

4. The method according to claim 1, wherein step A is carried out without filling the injection mould with moulding material.

5. The method according to claim 1, for determining the temperature control characteristic of the system which is to be temperature-controlled, a minimum achievable wall temperature ($T_{min}$) of the cavity of the injection mould is determined and stored.

6. The method according to claim 5, a maximum rise of a heating curve at a turning point (W) thereof is determined in Kelvin per second ($K/s_{heat}$).

7. The method according to claim 6, at the turning point of the heating curve, a tangent (T) is applied to the heating curve, and an intersection of the tangent (T) applied to the heating curve with another abscissa is formed, wherein a chronological interval between a start of heating and the intersection of the tangent (T) applied to the heating curve with the other abscissa is defined as a delay time ($tu_{heat}$).

8. The method according to claim 1, wherein a mean temperature ($T_{Basis}$) is calculated between a minimum achievable wall temperature ($T_{min}$) and the maximum wall temperature ($T_{max}$).

9. The method according to claim 8, wherein a maximum rise of a heating curve at a turning point (W) thereof is determined in Kelvin per second ($K/s_{heat}$), at the turning point of the heating curve a tangent (T) is applied to the heating curve and an intersection of the tangent (T) applied to the heating curve with another abscissa is formed, wherein a chronological interval between a start of heating and an intersection of the tangent (T) applied to the heating curve with the other abscissa is defined as delay time ($tu_{heat}$), wherein from the formula $t_{basisheat}=((T_{Basis}-T_{min})/K/s_{heat})+tu_{heat}$ an actuation time ($t_{basisheat}$) is calculated for a pulse heating from the minimum achievable temperature ($T_{min}$) to the mean temperature ($T_{Basis}$).

10. The method according to claim 9, wherein after the switching off of heating and after the actuation time ($t_{basisheat}$) has elapsed, a time span is measured until no further significant temperature change occurs at a temperature sensor, wherein a temperature ($T_{basisheat}$) and a reverberation time (dead time) ($t_{Basisheatdead}$) are measured and stored.

11. The method according to claim 10, wherein a deviation is calculated between the mean temperature ($T_{Basis}$) and the temperature ($T_{Basisheat}$) according to the formula $$T_{Basisheaterror}=T_{Basisheat}-T_{Basis}.$$

12. The method according to claim 11,
wherein in a process sequence for at least one pulse heating or at least one pulse cooling step, actuation times of a heating device and/or of a cooling device are measured and stored proceeding from a current temperature of a cavity wall ($T_{actMld}$), wherein a nominal temperature ($T_{Soll}$) is determined and when the nominal temperature ($T_{Soll}$) is greater than the current temperature ($T_{actMld}$), a process time ($t_{Prozess1}$) is calculated according to the formula $$t_{Prozess1}=((T_{Soll1}-T_{actMld})/K/S_{heat})+tu_{heat}+T_{Basisheaterror}/K/S_{heat}.$$

13. The method according to claim 1, wherein a mean temperature ($T_{Basis}$) is calculated between a minimum achievable wall temperature ($T_{min}$) and the maximum wall temperature ($T_{max}$), wherein the cooling is actuated, while heating is switched off, beginning from the maximum wall temperature ($T_{max}$) and from the formula
$t_{basiscool}=((T_{max}-T_{Basis})/K/S_{cool})+tu_{cool}$, an actuation time ($t_{basiscool}$) for a pulse cooling from the maximum wall temperature ($T_{max}$) to the mean temperature ($T_{Basis}$) is calculated.

14. The method according to claim 13, wherein proceeding from the maximum wall temperature ($T_{max}$) cooling is actuated and is switched off after the time ($t_{basiscool}$) has elapsed, wherein thereafter a time is measured until no more significant temperature change is measurable at a temperature sensor in the cavity, wherein a temperature ($T_{basiscool}$) and a reverberation time (dead time) ($t_{Basiscooldead}$) are measured and stored, and a deviation is calculated from ($T_{Basis}$) to ($T_{Basiscool}$) according to the formula $$T_{Basiscoolerror}=T_{Basis}-T_{Basiscool}.$$

15. The method according to claim 14, wherein when a nominal temperature $T_{Soll}$ is lower than a current temperature of a cavity wall ($T_{actMld}$) a process time ($t_{Prozess1}$) is calculated from the formula $$t_{Prozess1} = ((T_{Soll1} - T_{actMld})/K/S_{cool}) + tu_{cool} + T_{Basiscoolerror}/KS_{cool}.$$

16. The method according to claim 15, wherein the calculation of the time ($t_{Prozess1}$) for further heating and/or cooling processes is carried out in the same manner.

17. The method according to claim 16, wherein the calculation of the time ($t_{Prozess1}$) for a pulse heating process or for a pulse cooling process is carried out repeatedly.

18. The method according to claim 1, wherein during further heating and/or cooling processes actuation times of a heating device and/or of a cooling device are corrected by a start temperature deviation ($T_{startOffset}$) and/or an end temperature deviation ($T_{endOffset}$), wherein formulae listed below are used:

$$T_{startOffsetx} = T_{actMldx} - T_{(actMldx)n-1}$$

$$T_{endOffsetx} = T_{Prozessx} - T_{(Prozessx)n-1}$$

wherein (n−1) is a corresponding temperature from a preceding passage, wherein $T_{actMldx}$ is a temperature of a cavity wall at a start of a current process, wherein $T_{(actMldx)n-1}$ is a temperature of the cavity wall at a start of a previous process, wherein $T_{Prozessx}$ is a temperature of the cavity wall at an end of the current process, and wherein $T_{(Prozessx)n-1}$ is a temperature of the cavity wall at an end of the previous process.

19. The method according to claim 18, wherein a maximum rise of a heating curve at a turning point thereof is determined in Kelvin per second (K/$S_{heat}$), wherein a time ($t_{startOffset}$) and ($t_{endOffset}$) corresponding to the start temperature deviation ($T_{startOffset}$) and/or to the end temperature deviation ($T_{endOffset}$) is calculated depending on pulse heating (K/$S_{heat}$) or pulse cooling (K/$s_{cool}$), wherein:

For pulse heating: $t_{startOffset} = T_{startOffset}/K/s_{heat}$ $$t_{endOffset} = T_{endOffset}/K/s_{heat}$$

For pulse cooling: $t_{startOffset} = T_{startOffset}/K/s_{cool}$ $$t_{endOffset} = T_{endOffset}/K/s_{cool}.$$

20. The method according to claim 19, wherein an actuation time ($t_{Prozess(x)}$) for a current heating process and/or a cooling process is determined from an actuation time ($t_{Prozess(x-1)}$) from a previous heating process and/or cooling process plus the time ($t_{startOffset}$) from the current heating process and/or cooling process plus the time ($t_{endOffset}$) from the previous heating process and/or cooling process, which can be represented according to a formula as:

$$t_{Prozess(x)} = t_{Prozess(x-1)} + t_{startOffsetx} + t_{endOffset(x-1)}.$$

\* \* \* \* \*

UNITED STATES PATENT AND TRADEMARK OFFICE
CERTIFICATE OF CORRECTION

| | |
|---|---|
| PATENT NO. | : 11,433,588 B2 |
| APPLICATION NO. | : 16/632959 |
| DATED | : September 6, 2022 |
| INVENTOR(S) | : Martin Schneebauer and Stefan Moser |

It is certified that error appears in the above-identified patent and that said Letters Patent is hereby corrected as shown below:

In the Specification

Column 3, Line 21:
Please add:
"In known controls, considerable experience and responsibility is required on the part of the operator, depending on the complexity and the quality requirements for the moulded part, to adjust the corresponding trigger threshold values manually, in order to synchronize corresponding communication signals. It is disadvantageous here in particular that through the increase in complexity of the controls also an additional effort in terms of time has to be accepted in the setting up of the process."

Column 11, Line 37:
"injection mould has" should be "injection mould 4 has"

Signed and Sealed this
Eleventh Day of April, 2023

Katherine Kelly Vidal
*Director of the United States Patent and Trademark Office*